Aug. 26, 1969

F. LAURENT 3,463,929

LIGHT INTENSITY MEASURING DEVICE IN THE
OBJECTIVE-LENS OF A FILMING APPARATUS

Filed Oct. 5, 1966

INVENTOR

FRANCOIS LAURENT

BY Emory L. Groff

ATTORNEY

United States Patent Office 3,463,929
Patented Aug. 26, 1969

3,463,929
LIGHT INTENSITY MEASURING DEVICE IN THE OBJECTIVE-LENS OF A FILMING APPARATUS
Francois Laurent, Yverdon, Vaud, Switzerland, assignor to Paillard S.A., Sainte-Croix, Vaud, Switzerland, a company of Switzerland
Filed Oct. 5, 1966, Ser. No. 584,420
Claims priority, application Switzerland, Oct. 22, 1965, 14,650/65
Int. Cl. H01j 3/14
U.S. Cl. 250—216      5 Claims

ABSTRACT OF THE DISCLOSURE

A light intensity measuring device for a cinematographic camera having an objective lens including a prism provided with a central area within the path of the light directing light beams to both a viewfinder on the one hand and the film on the other hand while lateral reflective areas of the prism outside the path of light to the film direct light beams to a photosensitive means.

---

The present invention relates to a device for measuring the light intensity in the objective-lens of a filming apparatus.

Devices for the measurement of the light intensity in an objective-lens are already known which comprise photoelectric cells controlled by the light beam of the objective-lens. The majority of these devices only take away a small portion of the light to feed the cell, so as not to reduce too much the light intensity which is to act on the film. Thus, these measuring devices are not very sensitive.

In other devices, one employs a mirror placed in the path of the beam and which reflects 75% of the light onto the cell. The disadvantage of this device is that a mechanism must be provided to release the mirror when filming. The object of the present invention is to avoid these disadvantages.

According to the invention, the device for the measurement of light intensity in the objective-lens of a filming apparatus, the objective-lens comprising a prism with a semi-reflecting surface located in the path so as to deflect a portion thereof towards a viewfinder, is characterized in that at least a part of the prism area which is situated outside the path of the light reaching the film integrally sends the light striking it towards at least one photoelectric cell.

The accompanying drawing shows, diagrammatically and by way of example, one embodiment and a variant of the object of the invention.

Figure 1:
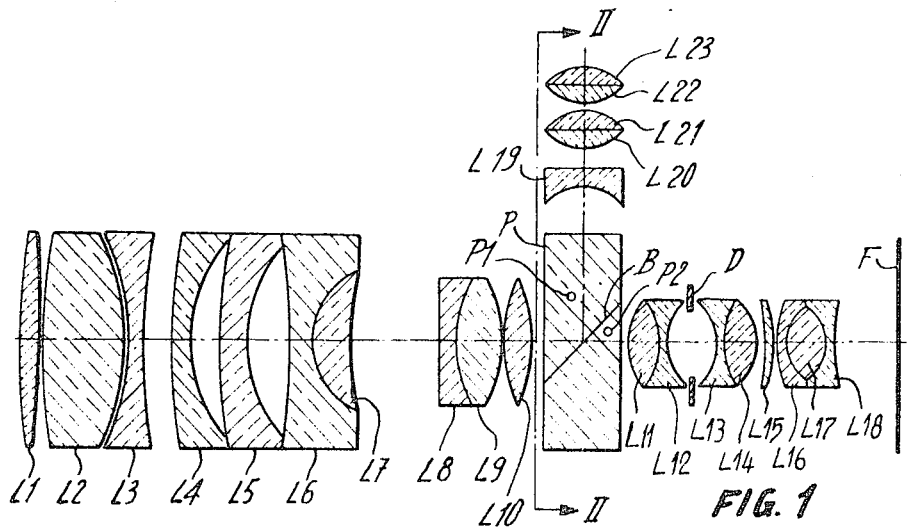
FIG. 1 is a longitudinal cross-section of a variable focal distance objective-lens comprising a device for the measurement of the light intensity.

The variable focal distance objective-lens, shown in FIG. 1, comprises, along the optical axis, a stationary lens L1, a first movable group of lenses L2–L3, a second movable group of lenses L4–L7, a third stationary group of lenses L8–L10, a prism P, a fourth stationary group of lenses L11–L18, and a diaphragm D. The film is shown at F. The prism P is constituted by a blade of glass consisting of two parts P1 and P2 joined by a chamfered edge B.

Figure 2:
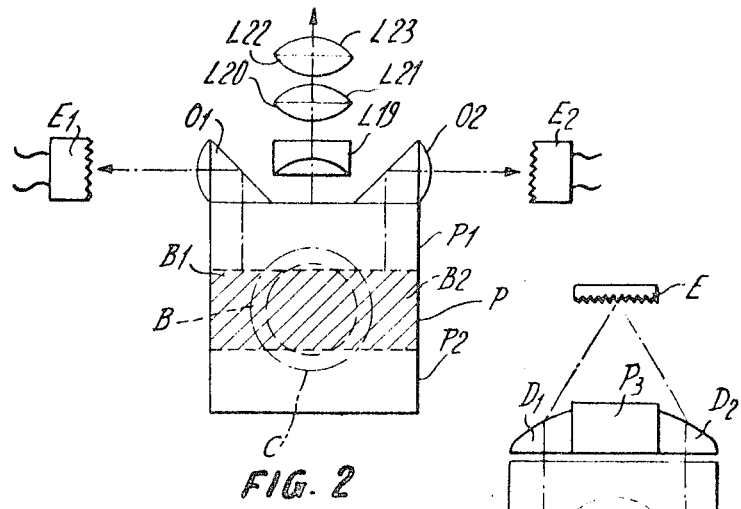
FIG. 2 is a view along line II—II of FIG. 1.

As is seen in FIG. 2, the zone of the prism P, traversed by the light reaching the film F, is defined by a circle C, shown in dot and dash lines. The part of the chamfered zone inscribed in the circle C is treated so as to send back only 25% of the light towards an optical system L19–L23 of the viewfinder, 75% of the light reaching the film F. The two zones B1, B2 of the chamfered part B, which are adjacent to the circle C and the light of which could not reach the film F, are treated so as to send back 100% of the light towards the corresponding cells E1 and E2, this through the agency of corresponding optical systems O1, O2.

As a variant, one could provide only a single optical system O1 or O2 and its corresponding cell E1 or E2. However, by connecting the galvanometer, not shown, of the measuring device simultaneously to two cells, one will have twice the sensitiveness.

Figure 3:
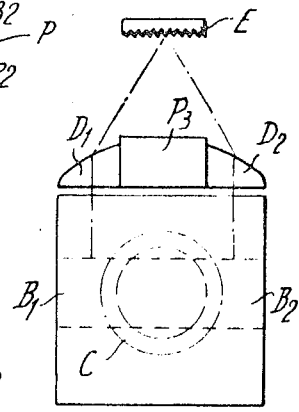
FIG. 3 is a view similar to FIG. 2 and shows a modification of the embodiment.

FIG. 3 shows a variant in which the light reflected by the zones B1, B2, B3 strikes two elements D1, D2 of a condenser the central part of which is replaced by a prism P3 which receives the rays intended for the viewfinder and reflects them obliquely towards the optical system of the viewfinder the optical axis of which is this time parallel to the optical axis of the objective-lens.

The two luminous beams passing through the elements D1, D2 of the condenser converge on a single photoelectric cell, or on a single photoconducting element E. In this way, all the energy of the light reflected by the zones B1 and B2 of the prism P is employed to excite the photosensitive element E.

One could also foresee another variant similar to that of FIG. 3, but in which the viewfinding optical system would be disposed as in the case of FIG. 1, while additional prisms would be provided to deflect the luminous beams reflected by the zones B1, B2 and send them on the elements D1 and D2 of the condenser which could thus be placed at any convenient point.

The resulting aberrations of the peripheral parts of the objective-lens (outside the zone C) and acting on the zones B1, B2 in no way influence the quality of the measurement of the photometer. Further, the elements are disposed in such a way that the light beam which strikes the cells does not change when one varies the focal distance, the prism P being disposed between the two fixed groups L8–L10 and L11–L18 at a point where the beam converges.

I claim:

1. A device for measuring the light intensity in the objective-lens of a cinematographic camera, comprising a prism located between lenses of said objective-lens and along the axis directed to the film to be exposed, said prism having a semi-reflecting surface located in the path of the light, a view-finder receiving the light reflected by said prism, said prism having at least one full-reflecting surface located outside the path of the light directed towards the film, and at least one photo-sensitive element exposed to the light reflected by said full reflecting surface.

2. A device according to claim 1, wherein said prism is made of two parts of glass each having a chamfered edge, said parts being joined by said chamfered edges, one of said chamfered edges being treated to give to a portion of its area semi-reflecting properties and to another portion of said area full-reflecting properties.

3. A device according to claim 1, wherein said prism is made of two parts of glass each having a chamfered edge, said parts being joined by said chamfered edges, the central portion of the area of one of said edges being treated to provide a semi-reflective surface, said area having two lateral portions adjacent to said central portion, said lateral portions being treated to be full-reflective.

4. A device according to claim 3, including two photosensitive elements, each of which is exposed to the light reflected by one of said lateral portions.

5. A device according to claim 3, including a single photosensitive element and two portions of a condenser, said condenser portions receiving the two luminous beams reflected by said lateral portions and converging onto said single photosensitive element.

References Cited

UNITED STATES PATENTS

| | | | |
|---|---|---|---|
| 2,945,132 | 7/1960 | Schuch | 250—216 X |
| 3,180,241 | 4/1965 | Mikusch et al. | 95—42 X |
| 3,385,190 | 5/1968 | Sho et al. | 95—42 |

WALTER STOLWEIN, Primary Examiner

U.S. Cl. X.R.

95—42; 250—220; 350—202